(No Model.)  C. A. LIEB.  5 Sheets—Sheet 1.

AUTOMATIC GRAIN SCALE.

No. 377,433.  Patented Feb. 7, 1888.

Witnesses:
Geo. W. Miatt.
D. W. Gardner.

Inventor:
Charles A. Lieb,
by Phillips Abbott,
his Attorney.

(No Model.) 5 Sheets—Sheet 2.

C. A. LIEB.
AUTOMATIC GRAIN SCALE.

No. 377,433. Patented Feb. 7, 1888.

Fig. 2.

Witnesses:
Geo. W. Miatt
D. W. Gardner

Inventor:
Charles A. Lieb
by Phillips Abbott
his Attorney (No Model.) 5 Sheets—Sheet 3.

C. A. LIEB.
AUTOMATIC GRAIN SCALE.

No. 377,433. Patented Feb. 7, 1888.

Witnesses:
Geo. H. Miatt
D. W. Gardner

Inventor:
Charles A. Lieb
by Phillips Abbott
his attorney

N. PETERS, Photo-Lithographer, Washington, D. C.

(No Model.) 5 Sheets—Sheet 4.

C. A. LIEB.
AUTOMATIC GRAIN SCALE.

No. 377,433. Patented Feb. 7, 1888.

Witnesses:
Geo. H. Hiatt
D. W. Gardner

Inventor:
Charles A. Lieb.
by Phillips Abbott
his Attorney

N. PETERS, Photo-Lithographer, Washington, D. C.

(No Model.)     5 Sheets—Sheet 5.

C. A. LIEB.
AUTOMATIC GRAIN SCALE.

No. 377,433.  Patented Feb. 7, 1888.

Witnesses:
Geo. W. Miatt
D. W. Gardner

Inventor:
Charles A. Lieb
by Phillips Abbott
his attorney

UNITED STATES PATENT OFFICE.

CHARLES A. LIEB, OF NEW YORK, N. Y.

AUTOMATIC GRAIN-SCALE.

SPECIFICATION forming part of Letters Patent No. 377,433, dated February 7, 1888.

Application filed September 3, 1887. Serial No. 248,744. (No model.)

*To all whom it may concern:*

Be it known that I, CHARLES A. LIEB, a citizen of the United States, and a resident of New York city, in the county of New York and State of New York, have invented certain new and useful Improvements in Automatic Grain-Scales, of which the following is a specification.

My invention relates to improvements in automatic grain-meters, being adapted, also, to weighing other materials, and has especial reference to improvements in the details of construction, whereby accuracy, uniformity, and reliability of operation are secured.

The class of grain-meters to which my improvements are especially applicable is that in which an oscillating receiver is suspended from a weighted scale-beam, the receiver having a centrally-located partition which divides it into two substantially-equal chambers, each of which has a gate at its lower portion, which gates are opened and closed automatically by the movement of the receiver, there being also a feeding-hopper provided with an automatic grain-cut-off valve and a receiving-hopper to receive the weighed grain from the machine and a registering-indicator which automatically registers the amount of grain passed through the machine.

In machines of the class stated the special difficulty heretofore experienced has been to maintain uniformity of action in the machine, allowing for wear of the parts, changes in temperature, deposits of dust, and other obstructive agencies which affect the accuracy of its operation. Many different devices have heretofore been employed to secure the desired end, but, so far as I am aware, without very satisfactory results, inasmuch as in running large quantities of grain a considerable variance in the action of the machine has been noticed, and I have discovered that these variances are principally due to the following defects, to which my improvements are directed:

First. The oscillating receiver and also the scale-beam have heretofore been fulcrumed on knife-edge bearings, or else on ordinary pivots or shafts. The knife-edges, being far more sensitive than the pivots, have been more frequently employed. In both cases differences of temperature have changed by contraction and expansion the accuracy of the bearings, causing binding of the parts, which in apparatus of this kind, which depends for its accuracy largely upon the absence of friction, throws it out of register, and by the indefinite multiplication of even small variances results in a total inaccuracy of large amount. The knife-edges, moreover, speedily wear away, so that their sensitiveness is lost. If they be made very hard, they are apt to chip when twisted slightly, because of springing of the parts consequent on changes of temperature, and if soft they soon flatten down. Moreover, the fine dust of flouring-mills gets into the joints and packs therein with great firmness, so much so that unless frequently removed the apparatus will sometimes become choked therewith and fail to operate.

Second. Another source of inaccuray has been the friction between the detents and the pins which engage with them, used to hold the oscillating receiver in proper position until the requisite amount of grain has entered it. This friction, of course, is the equivalent of added weight on the scale-beam, and it constantly varies, owing to the presence or absence of dust, dirt, &c., and also to some extent on the temperature, and these small variances many times multiplied, as before stated, result in a total inaccuracy of large amount.

Third. Another source of inaccuracy is the faulty operation of the discharge-gates at the lower end of the receiver-chambers. These are usually at the present time closed by the oscillation of the receiver, which presses the open gate closed by its impact against a roller or its equivalent attached to some suitable part of the machine; and to secure smooth and uniform operation both of the gates should bear with the same and with nicely-adjusted pressure against these rollers, and inasmuch as the receivers are made by hand and from sheet metal it is impossible to get them all alike and of exactly the same dimensions. Therefore there has always heretofore been inaccuracy in the operation of this part of the machines.

Fourth. The stay-rods at the foot of the frame, which sustain the oscillating receiver, as heretofore constructed have been inexact in operation.

My invention pertains to improved devices whereby I obviate the foregoing difficulties.

In the drawings the same reference-letters indicate the same parts in all the figures.

A is the frame of the apparatus. It is preferably cast all in one piece.

B is an indicator attached to the frame A. It forms no part of my invention, although used in connection with the apparatus, and may be of any desired construction and operated in any desired manner, the power being taken from any suitable moving part of the apparatus. I show in Fig. 3 an ordinary slotted lever, B', which is attached to the shaft of the indicator and engages with a pin, B², on the receiver.

C is the oscillating receiver.

D is a partition running vertically through the receiver, dividing it into two equal compartments.

D' D' are the grain-discharge gates located at the bottom of each compartment. They are hinged at D² D² to the sides of the receiver and swing downwardly in opening, and are closed by being alternately pressed against rollers when the receiver oscillates, as hereinafter explained.

E E are two suspension-rods connected at top and bottom by a horizontal framing, F F.

G G are tubular pieces fastened to the suspension-rods E E. They are set in bushings H, which are bored centrally, and through them a continuous rod, I, passes from side to side of the machine, passing through a tube, J, made half and half in the partition D and in another piece of metal having a half-round concavity in it which is fastened to the partition. The rod I fits this tube loosely and the tubular pieces G G bear against the side of the receiver adjacent to the rod for the purpose of centering the receiver. Their ends are pointed, as shown, to reduce friction. The receiver oscillates on the rod I, which may turn in the bushings, or the rod may be stationary and the receiver turn on it, depending upon where the least friction occurs. A set-screw, K, fastens the centering-tubes G at such position as may be desired.

L is the scale-beam. It is bifurcated, or, in other words, provided with laterally-extending arms M M, which extend from each side of the scale-beam to somewhat more than the width of the receiver and then turn at right angles, as at M' M', part way across the ends of the receiver.

N is the weight on the scale-beam. It is pivoted at N' and provided with a set-screw, N², which works in a slot, N³, made in a stud on the end of the scale-beam, whereby the weight may be adjusted toward and from the receiver to secure accuracy by thus compensating for atmospheric influences, dust, &c. The weight is located considerably above the beam, so that as the beam rises the line of gravity of the weight may approach nearer and nearer to the fulcrum of the beam.

O is a trunnion formed on the frame A, and P is a trunnion formed on the upper cross-frame of the suspension-rods E E.

Q and Q' are counterpart trunnions formed on the short arms M' of the scale-beam. The trunnion Q has an upward presentation and Q' has a downward presentation. There are, of course, trunnions corresponding to O, P, Q, and Q' on the other side of the machine.

Figure 7:
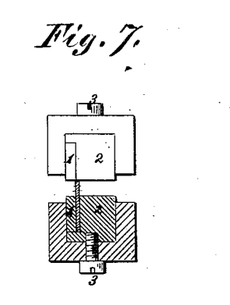
Fig. 7 is an enlarged view of the suspension-strips on which the receiver oscillates.
Figure 14:
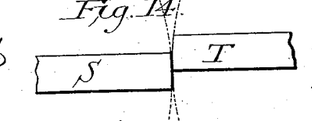
Fig. 14 illustrates an enlarged side view of the meeting ends of the locking-pawls S and T, showing the curvature of the meeting ends.

R R' are thin strips of metal, the ends of which are fastened in the several trunnions above recited, as shown in Fig. 7—that is to say, the ends of the strips of metal are entered between two metallic pieces, 1 and 2, and they are riveted or otherwise firmly fastened together, clamping the end of the metal firmly between them. These pieces, 1 and 2, with the strip in position, are then placed in suitably-formed recesses made in the trunnions, and are fastened laterally by set-screws 3.

S S are stop-pawls. They are pivoted to laterally-extending studs S' S', which are made on the respective ends of a light casting, S², which is screwed or otherwise fastened to the side of the receiver. The free ends of these pawls are respectively ground on the arc of a circle the center of which is the pivot on which they turn. These pawls have each of them a small supplemental projection, S³ S³, which forms an integral part of them, and which rests on the upper end of a small pointed set-screw, S⁴, threaded into a small lug on the casting S², whereby the pawls S are prevented from dropping lower than allowed by these set-screws. They are pointed to prevent accumulation of dust thereon.

T T are corresponding pawls, which are pivoted at T′ T′ to a bracket which is fastened to the suspension-rod E. They are supported in a horizontal position by a ledge, T², formed on the said rod. The adjustment of the parts is such that the oscillations of the receiver will carry the free ends of each pair of these pawls past each other to such an extent that the uppermost one will drop down partly across the end of the other and abut against it end to end, the pawls S S being of course the moving ones, the others not oscillating.

U U are set-screws placed in the ends of a bar, U′, which is screwed or otherwise fastened to the frame A. These set-screws are so adjusted that as the receiver commences to sink under its load of grain they impinge against the under side of the pawls S S and tilt them upwardly.

V is an inverted pan-shaped piece of sheet metal placed in the lower or receiving hopper. It is rigidly attached to the ends of vertical rods V′, one on each side of the machine, which are sustained at their lower ends by passing between two pins, V² V², which are fastened in any suitable manner in the frame A. The rods V′ are pivoted at the ends of levers V³, which are pivoted to a shaft, V⁴, extending at each side from the feeding-hopper V⁵. This shaft has a clapper-valve or its equivalent attached to it within the hopper V⁵, which closes and opens the grain-supply passage in the bottom of the hopper. The levers V³ are each provided with a weight, V⁶, the descent of which is limited by set-screws V⁷, which pass through flanges V⁸, formed on lugs V⁹ of the frame A. By the appropriate adjustment of the set-screws V⁷ the extent to which the valve within the hopper V⁵ will be opened may be determined, and thus the maximum rapidity of inflow of grain to the receiver be controlled. This is desirable under certain circumstances.

W W are the gate-closing rollers. They turn on little shafts W′, attached to the swinging frames W². These frames are pivoted at W³ to stanchions W⁴ on the lower cross-frame of the suspension-rods E.

W⁵ are set-screws, each provided with set-nuts W⁶. They pass through threaded studs W⁷, rigidly attached to the cross-frame. By running these set-screws in or out the swinging frames W², which carry the rollers W, are set up nearer to or removed farther from the gates D′, thus providing accurate adjustment, whereby exactly the right pressure may be applied to each of the gates to secure their closing when the receiver oscillates, and this pressure may, by the proper adjustment of the rollers, be made the same on both of the gates.

A′ A′ are thin and very flexible metallic strips. They are fastened at either end to the main frame A, as at A² A², and at the center to the lower end of the suspension-rods E, as at A³, or to some other suitable part of the suspension-rod frame, at or near the lower part thereof. The length of these strips is accurately adjusted to the downward motion of the suspension rods or frame E, so that when in their most elevated position these strips will be stretched tight, thus holding the suspension-rods truly vertical and maintaining the proper relation between the pawls S S and their tripping set-screw, U, thus securing uniformity in the tripping operation.

Figures 1, 11:
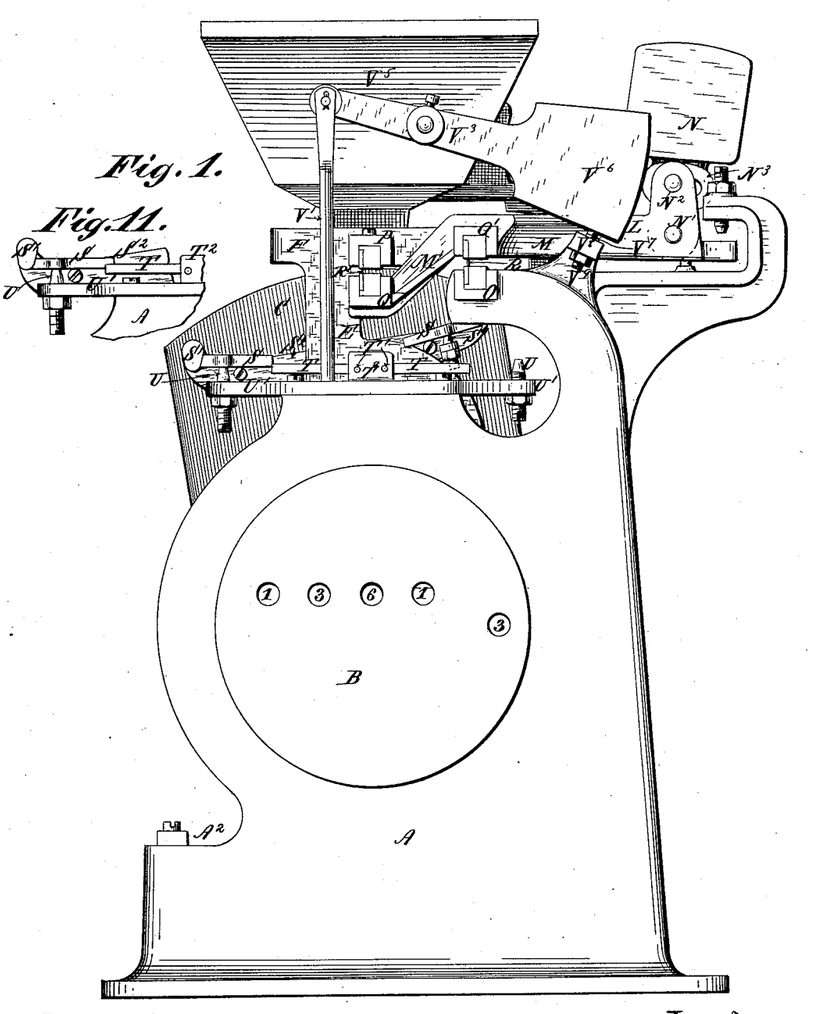
Figure 1 illustrates a side elevation of my improved machine.
Fig. 11 illustrates an alternative construction of the locking-pawls which steady the receiver.
Figure 2:
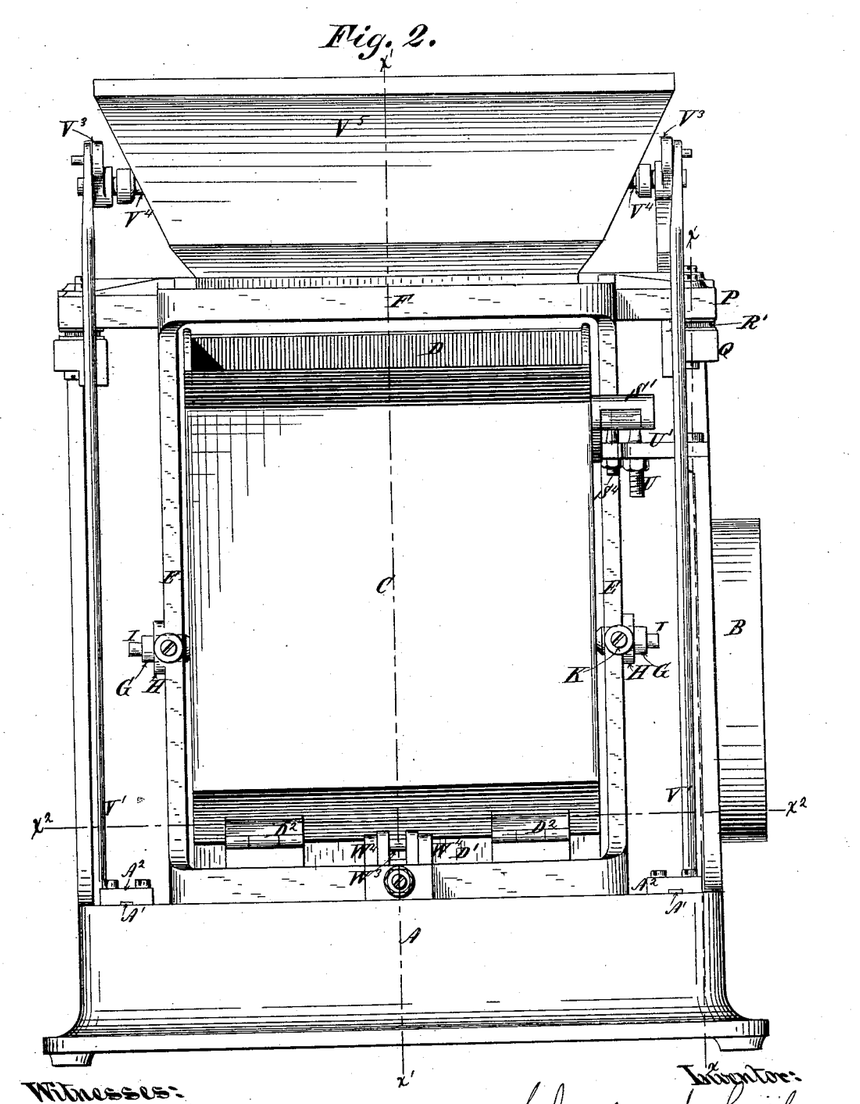
Fig. 2 illustrates a front elevation of my machine.
Figures 3, 8, 12, 13:
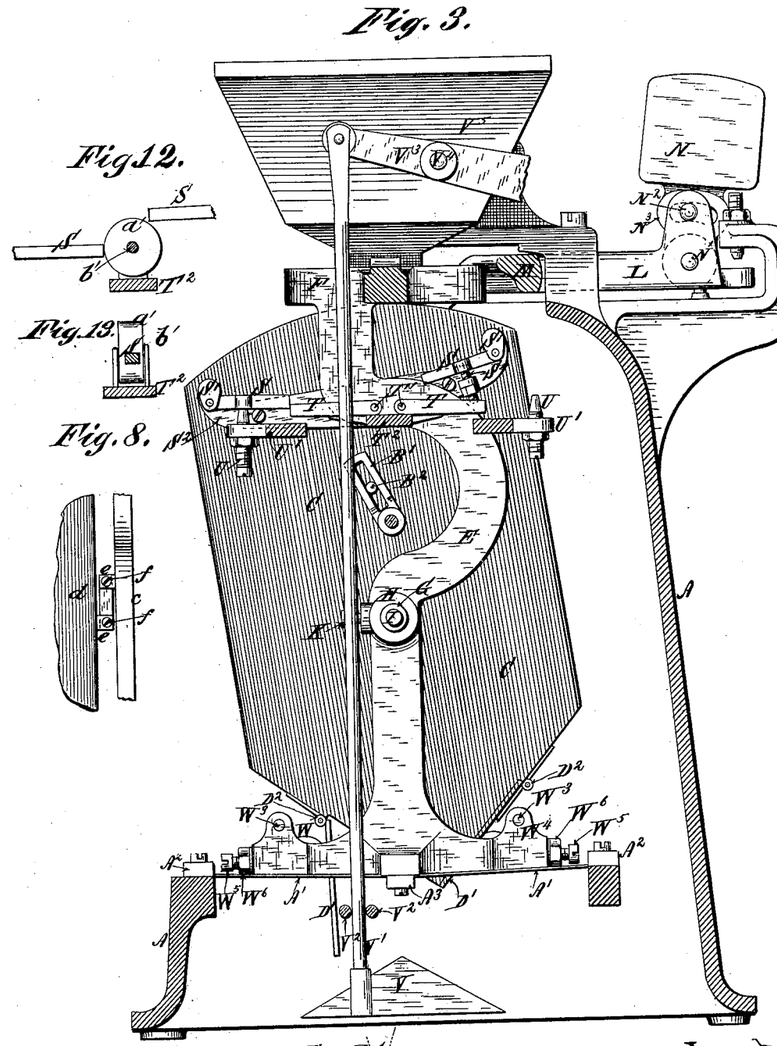
Fig. 3 illustrates a vertical section taken on the line $x$ $x$ of Fig. 2, the weight-bearing lever for the inlet-valve being broken off.
Fig. 8 illustrates a method of applying the suspension-strips for the support of the oscillating bucket.
Figs. 12 and 13 illustrate still a different construction of the locking mechanism for retaining the bucket in proper position.
Figures 4, 9, 10:
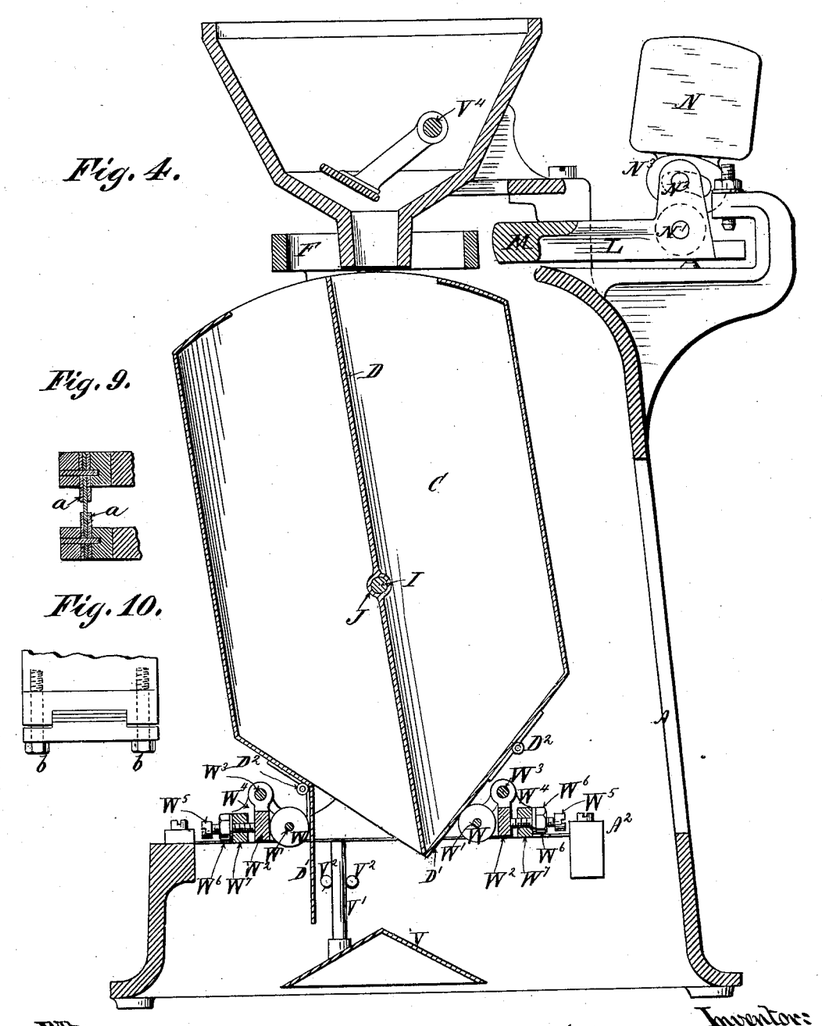
Fig. 4 illustrates a vertical section on the line $X'$ $X'$ of Fig. 2.
Fig. 9 illustrates a vertical section of a modified construction of the suspension-strips.
Fig. 10 illustrates a top view of the devices shown in Fig. 9.
Figure 5:
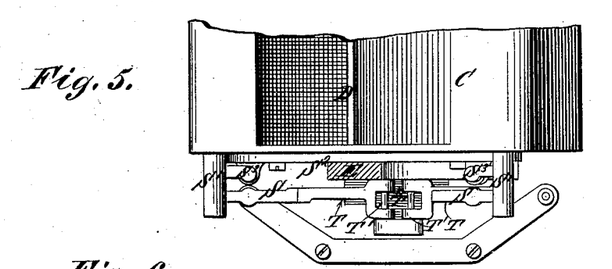
Fig. 5 illustrates a top plan view showing the construction and operation of the pawls which steady the receiver during the filling operation.
Figure 6:
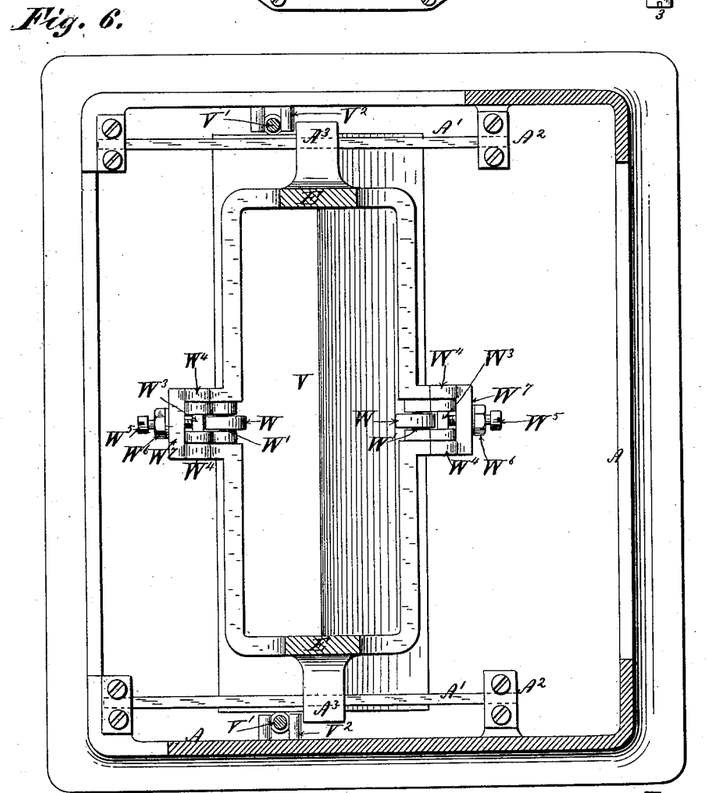
Fig. 6 illustrates a top plan view showing the construction and operation of the gate-closing rollers and adjacent parts. It is taken on the line $X^2$ $X^2$ of Fig. 2.

The operation is as follows: The weights V⁶ normally elevate the inverted-pan-shaped part V and open the grain-inlet valve on the shaft V⁴. The grain runs through the hopper V⁵, filling that one of the compartments of the receiver which is presented to it. When sufficient grain has entered this compartment to overcome the counterbalance-weight N on the scale-beam, then the receiver and its suspension-rods E and the frame thereof all commence to descend. As soon as this takes place one or the other of the pawls S, as the case may be, comes in contact with the upper end of its tripping set-screw U, and, the receiver continuing to descend, the pawl S is tilted upwardly, usually carrying the free end of the coacting pawl T with it, and because the ends of both of these pawls are rounded in vertical planes on arcs of circles determined by their respective pivots there is no jumping or strain as they thus rise. After the receiver has descended some distance, however, the deflection of these pawls from a straight line becomes such that their meeting ends slip on each other; and inasmuch as the pawls S are set, as shown in Figs. 1 and 3, in such a manner that their ends do not slide completely past the ends of the coacting pawls T, but simply lap the upper half thereof, when the slipping referred to takes place the pawls S invariably are the uppermost ones, the pawls T dropping down and resting in a horizontal position on the ledge T′. The instant the pawls slip past one another, as stated, the receiver, under the weight of its one-sided load, oscillates on its pivots I, and the gate D′ at the bottom of the loaded compartment, being relieved from the pressure of its roller W, opens and discharges its contents upon the inverted-pan-shaped piece V. The roller W on the opposite side of the machine during the oscillation of the receiver closes its gate D′. The instant the discharged grain strikes the pan V it is depressed, overcoming the weight of the counter-balances V⁶, and closes the inlet-valve on the shaft V⁴. This is done not to control the amount of grain weighed, because the weighing is accomplished before this valve acts, but so that if, for any reason, the grain cannot be carried away from the scales—as, for instance, because of stoppage of the stones in a grinding-mill or the closing of the gate in the delivery-ducts below the lower hopper—then the grain will back up until finally the pan V will at one of its descents be buried in the grain and will not rise again, the weight of the superimposed grain holding it down, thus, also, holding the valve on the shaft V⁴ closed until the grain runs away again, freeing the mechanism and allowing it to operate again. The sloping upper side of the pan V always clears it of grain when there is vacant space below it into which the grain can slide. The moment the discharged grain has slid off from the inverted pan V the weight $V^6$ lifts the pan and opens the grain-inlet valve on the shaft $V^4$. The grain then again commences to flow into the second compartment, the receiver having by this time been again elevated by the weight N and the other pair of pawls S T having assumed their end-to-end-locking position, holding the receiver in its proper position. The flexible strips R R' during the movement of the scale-beam are flexed from their normal line. The power required to so flex these strips will be a constant quantity, and is allowed for in the adjustment of the machine. It will be noticed that as the beam rises the weight N, being placed above the beam, is carried nearer and nearer to its fulcrum. Thus the power of the weight is reduced in proportion to the increased force required to knock off or trip the locking-pawls and to flex the sustaining-strips R R'. In this way rapid oscillation and descent of the receiver is secured. In order that the bending of these flexible strips may be always at the medial horizontal line thereof, between the trunnions P and Q and Q' and O, respectively, on both sides of the machine, I sometimes provide metallic leaves at the sides of these strips, as shown in Fig. 9, at $a\ a$, &c. I prefer that these leaves $a\ a$ should be elastic and have spring-temper, in order that they may spring or bend with the strips R R' and compel them to bend evenly on both sides of the machine, so that there will be no twisting of the receiver, which tends to break the strips R R', and also affects the accuracy of the weighing. The leaves also act as re-enforcers for the strips R R', thus reducing their liability to snap off under the shock of the vibration of the receiver. In Fig. 10 I show a top or bottom view of these parts (both top and bottom presenting the same appearance) and the method of clamping them in the trunnions by means of the screws $b\ b$.

In Fig. 11 I show an alternative construction of the locking-pawls. Instead of employing the pointed set-screws which determine the downward movement of the pawls S S, I provide a longitudinal extension projecting from the upper side of these pawls and beyond their ends which lap upon the top of the coacting pawls T. This lip always acts to compel the pawls to rest upon the pawls T. Thus the pawls S are always the uppermost ones, and fouling or jamming of the pawls is prevented.

In Fig. 12 I show an alternative construction of the locking-pawls in it. Instead of the pawls T T, I employ a roller, $a'$, which turns loosely on a pivot, $b'$, attached to $T^2$. The pawls S rest against the periphery of this roller on opposite sides thereof in a line horizontal, or practically so, with the pivot $b'$, and when the receiver sinks under its load the pawls S roll the roller over, and they are thus tripped. It is obvious that this construction is the equivalent of the end-to-end-acting pawls hereinbefore described, that part of the roller which lies between its axis and periphery in line with the coacting pawl S being in effect the counterpart pawl T, and acts in conjunction with the pawl S in the same manner that the pawl T does.

It is obvious that the trunnions may be so arranged by simply transposing their relative positions that the flexible strips R and R' will be subjected to a stretching instead of a crushing strain, as shown in the drawings. Their action is substantially the same in either construction, and I do not limit myself to the specific arrangement shown.

Instead of employing the rod I and centering-points G, I sometimes suspend the receiver also on these flexible strips, as shown in Fig. 8, $c$ being a part of one of the suspension-rods, and $d$ being the receiver. Suitable brackets, $e\ e$, are provided on the suspension-rods and on the sides of the receiver, respectively, between which the flexible strips extend, being clamped at its ends by any suitable means. Screws $f\ f$ are shown in this figure for this purpose.

I do not limit myself to the specific details of construction shown, since they may be somewhat altered and still my improvement be practically employed.

I do not herein claim that part of my invention which consists in the employment of a weight so constructed and arranged that it approaches the fulcrum of the scale-beam as the beam rises, in combination with the flexible sustaining-strips R R', or in combination with any of the other elements shown herein, excepting as herein specifically claimed; but I do not abandon the same, and I shall prior to the issuance of this present patent file another application for a patent therefor.

Having described my invention, I claim—

1. The combination of an oscillating receiver provided with a centrally-located partition, pivoted pawls attached to the receiver, their ends respectively opposite the pivots being capable of independent motion, counterpart pivoted pawls attached to the suspension-rods of the bucket, and stops to determine the movement of the pawls, substantially as set forth.

2. The combination of an oscillating double-chambered receiver, pivoted pawls attached thereto, counterpart pivoted pawls attached to the suspension-rods, the meeting ends of the pawls being formed on arcs of circles the centers of which, respectively, are the pivots on which they turn, and stops to determine the movement of the pawls, substantially as set forth.

3. The combination of an oscillating double-chambered receiver hung on a weighted scale-beam and having a downward movement when loaded, pawls attached to the receiver, set-screws or equivalent devices on the frame of the machine, which engage with the pawls on the receiver and tilt them when the receiver sinks, counterpart pivoted pawls attached to the suspension-rods of the bucket, and stops to determine the movement of the pawls, substantially as set forth.

4. The combination, in a weighing-machine, of an oscillating receiver, pivoted pawls attached to the receiver, their ends respectively opposite the pivots being capable of independent motion, counterpart pivoted pawls attached to the suspension-rods of the receiver, and a gate at the bottom of the receiver operated by the oscillation thereof, substantially as set forth.

5. The combination, in a weighing-machine, of an oscillating receiver, pivoted pawls attached thereto, counterpart pivoted pawls attached to the suspension-rods, the meeting ends of the pawls being formed on arcs of circles the centers of which, respectively, are the pivots on which they turn, and stops to determine the movement of the pawls, substantially as set forth.

6. The combination of oppositely-arranged trunnions or brackets, flexible strips of metal extending from one to the other, and leaves fastened to the trunnions by the side of the said flexible connecting-strip, substantially as set forth.

7. The combination, in a grain-scale, of swinging lower gates hinged to an oscillating receiver, a suspension-frame hung to a weighted scale-beam, and rollers which impinge on the gates and control the position thereof when the receiver is oscillated, said rollers being pivoted in a movable support attached to the receiver-holding frame and provided with an adjusting set-screw adapted to move the roller-support toward the gate, whereby the rollers may be adjusted to and from the gates, substantially as described.

8. The combination of an oscillating receiver suspended from a rising and falling suspension-frame which is hung to a scale-beam, and a flexible strip of metal attached to the frame of the machine at both ends and to the suspension-frame at its central part, and pivoted pawls which control the position of the receiver and which are tripped by its descent, substantially as set forth.

9. The combination of a rising and falling receiver hung to a scale-beam, and one or more flexible stay-strips attached to the frame of the machine at both ends and directly or indirectly to the receiver between the ends, substantially as set forth.

10. The combination of an oscillating receiver, pivoted pawls attached to the receiver, pivoted counterpart pawls attached to the suspension-rod of the machine, substantially as described, and stops for the pawls which are pivoted to the receiver, adjusted to hold their free ends sufficiently above the ends of the pawls attached to the suspension-rod to insure their being the uppermost ones when the pawls are tripped by the descent of the receiver, and a tripping device placed on the frame which engages with the pawls on the receiver when it descends, substantially as set forth.

11. The combination of a pivoted pan or its equivalent, upon which the grain is discharged from the receiver, a rod which connects the pan with the shaft of the inlet-valve, a weight which normally acts to open the valve and to elevate the pan, and a set-screw whereby the extent to which the inlet-valve may be opened will be determined, substantially as set forth.

12. The combination of an oscillating receiver supported from a suspension-frame which is hung to a scale-beam by flexible metallic strips, as described, locking devices to hold the receiver in its dual positions, which are tripped by the descent of the receiver, and a weight for the scale-beam located above the beam, substantially as set forth.

13. The combination of a rising and falling receiver supported from a suspension-frame which is hung to a scale-beam by metallic strips, a gate at the lower part of the receiver closed by adjustable rollers, a flexible metallic tie rod or strip attached to the lower part of the receiver and to the frame of the machine, and a weight for the scale-beam located above the beam, substantially as set forth.

14. An automatic grain-scale embodying, essentially, the following features, constructed and arranged substantially as hereinabove described, to wit: an oscillating double-chambered receiver attached directly or indirectly to a weighted scale-beam, gates at the lower end of the compartments controlled by adjustable rollers and operated by the rising and falling of the receiver, a flexible stay strip or strips adjusted to center the receiver when at its uppermost position, locking-pawls which control the position of the receiver during the inflowing of the material to be weighed by abutting against each other end to end, tripping devices for disengaging the locking-pawls during the descent of the receiver, and an adjustable inlet-valve closed by the discharge of the material from the receiver, as set forth.

15. The combination of an oscillating receiver supported from a suspension-frame which is hung to a scale-beam by a flexible metallic strip or strips, a gate at the lower part of the receiver, pivoted pawls attached to the receiver, counterpart pivoted pawls attached to the suspension-frame, and a weight for the scale-beam constructed and arranged so that its line of gravity approaches the fulcrum as the weight moves, substantially as set forth.

16. The combination of an oscillating receiver hung from a scale-beam, pivoted pawls attached to the receiver, counterpart pivoted pawls which engage end to end with the pawls attached to the receiver, and a weight for the scale-beam constructed and arranged so that its line of gravity approaches the fulcrum as the weight moves, substantially as set forth.

17. The combination of an oscillating receiver hung to a weighted scale-beam, flexible strips attached at one end to the beam and at the other to a suitable support, pivoted pawls attached to the receiver, and counterpart pivoted pawls attached to the suspension-rods of the receiver, substantially as set forth.

18. The combination, in a weighing-machine, of a vertically-moving receptacle for the material to be weighed and a flexible tie rod or strip attached directly or indirectly to the said receptacle and to the frame of the machine, substantially as set forth.

Signed at New York, in the county of New York and State of New York, this 29th day of August, A. D. 1887.

CHARLES A. LIEB.

Witnesses:
PHILLIPS ABBOTT,
GEORGE A. VOSS.